United States Patent [19]

Dunaway et al.

[11] Patent Number: 5,047,375
[45] Date of Patent: Sep. 10, 1991

[54] METHOD FOR PRODUCING HIGH OPACIFYING KAOLIN PIGMENT

[75] Inventors: Weyman Dunaway, Sandersville; Ralph E. Turner, Tennille, both of Ga.

[73] Assignee: ECC America Inc., Atlanta, Ga.

[21] Appl. No.: 288,681

[22] Filed: Dec. 22, 1988

[51] Int. Cl.$^5$ .......................... C04B 33/00; C09C 1/36
[52] U.S. Cl. ..................... 106/439; 501/145; 501/147; 106/446; 106/442
[58] Field of Search ............... 501/146, 150, 147, 145, 501/148; 106/439, 442, 446, 463, 464, 468

[56] References Cited

U.S. PATENT DOCUMENTS

| | | | |
|---|---|---|---|
| 3,586,523 | 6/1971 | Fanselow et al. | 501/150 |
| 3,765,921 | 10/1973 | Puskar | 501/147 |
| 4,014,709 | 3/1977 | Dykstra et al. | 106/446 |
| 4,346,178 | 8/1982 | Economou | 501/148 |
| 4,419,228 | 12/1983 | Cook et al. | 501/150 |
| 4,468,317 | 8/1984 | Turner, Jr. | 501/148 |
| 4,826,536 | 5/1989 | Raythatha et al. | 106/468 |
| 4,851,048 | 6/1989 | Jones et al. | 106/463 |

*Primary Examiner*—William R. Dixon, Jr.
*Assistant Examiner*—Paul Marcantoni
*Attorney, Agent, or Firm*—Klauber & Jackson

[57] ABSTRACT

A method of producing a high opacity paper filler pigment which comprises subjecting an iron-stained titania-containing kaolin to beneficiation by froth flotation or high intensity magnetic separation; recovering the froth or magnet rejects, dewatering and drying the rejects to produce a kaolin enriched in titania, and calcining the same at a temperature in the range of about 1500° to about 2200° F.

12 Claims, 1 Drawing Sheet

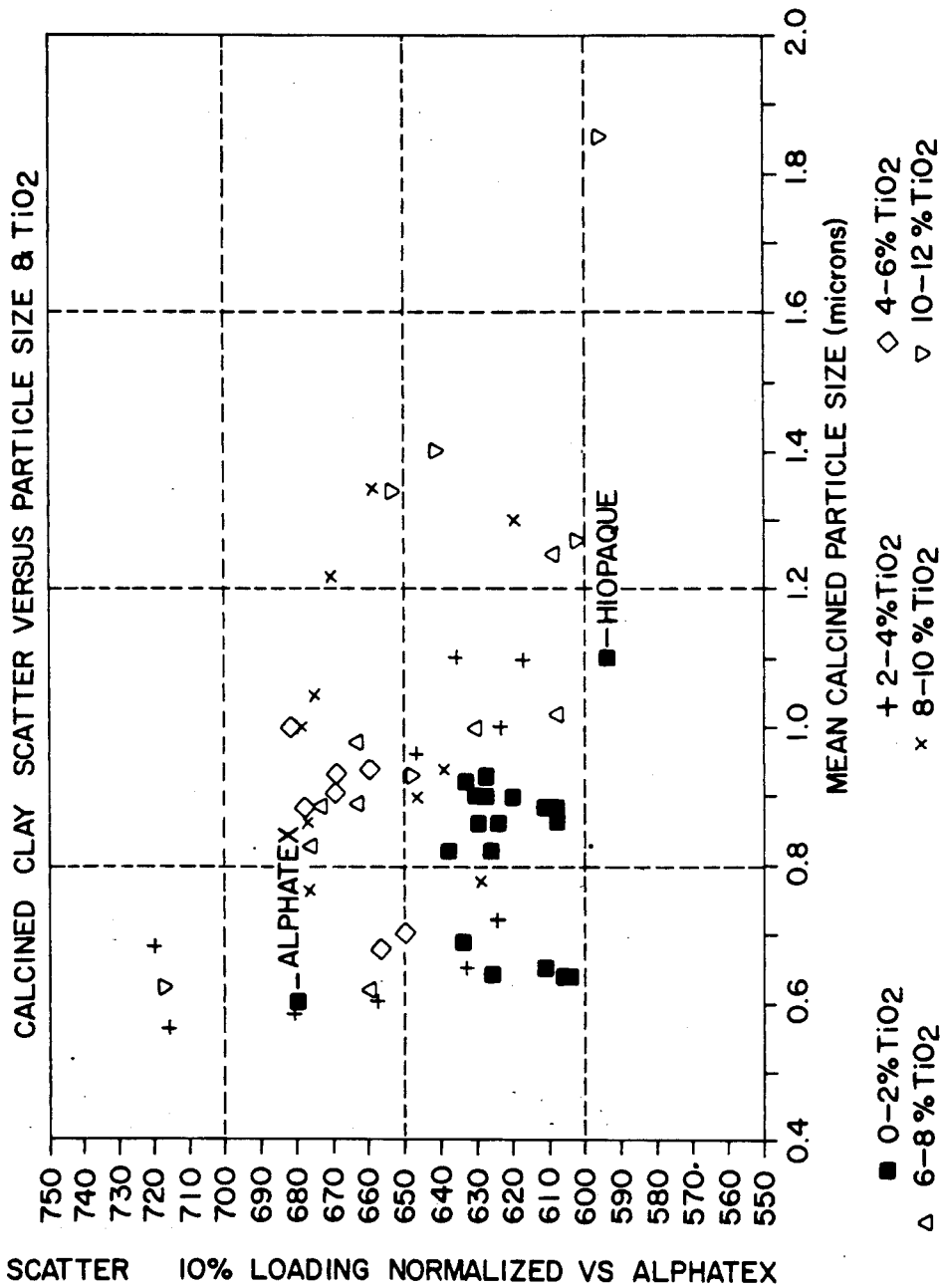

METHOD FOR PRODUCING HIGH OPACIFYING KAOLIN PIGMENT

BACKGROUND OF INVENTION

This invention relates generally to calcined clay products. More specifically, it relates to a calcined kaolin clay pigment and method of manufacture of same. The pigment produced by the method of the invention has very high opacifying properties when incorporated as a filler in paper products.

In the course of manufacturing paper and similar products, it is well known to incorporate quantities of inorganic materials into the fibrous web in order to improve the quality of the resulting product. The use of appropriate such fillers vastly improves the opacity and printability of certain types of light weight papers such as newsprint. This aspect of use of calcined kaolin clay pigments is discussed in some detail, for example, in Fanselow and Jacobs, U.S. Pat. No. 3,586,523. Other aspects of the presently preferred commercial methods for manufacturing calcined kaolin pigments for use particularly as fillers in paper manufacture, are also set forth in the said Fanselow et al patent, as well as in additional United States patents such as McConnell et al, U.S. Pat. No. 4,381,948.

The Fanselow et al and McConnell et al patents are indeed representative of the methodology now widely employed in the kaolin industry in order to produce calcined kaolin clay pigments for use in paper manufacturing. Study of these patents will show that the objective of same, as is customary in the art, is to produce a fine particle size calcined kaolin clay pigment of relatively very high brightness, beginning with a crude kaolin which has a relatively very low brightness. Indeed, a preferred crude feed material for use in processes such as are disclosed in the Fanselow and McConnell patents, is a highly discolored, so-called "gray" kaolin, which is referred to in the Fanselow patent as a "hard sedimentary kaolin clay." Thus, the gray crude which is used in the example of Fanselow has an initial brightness of 78, where the figure cited refers to the so-called GE scale. Procedures for measuring brightness as set forth in this application, and as is generally recognized in the industry, are in accord with TAPPI procedure T646os75. As a result of the beneficiation treatment set forth in the Fanselow et al patent, these brightnesses are considerably increased indeed to a very high whiteness. Claim 2 of said Fanselow et al patent thus recites a GE brightness within the range of 92% to 95%. Similarly, the McConnell et al patent describes a resultant pigment having a brightness of at least 93 as being the final output product from practice of the beneficiation methods set forth therein. A calcined kaolin pigment substantially produced in accordance with the McConnell et al patent is available commercially from Anglo-American Clays Corporation, under the trademark ALPHATEX®.

It is of particular interest pertinent to the present invention to observe that in the McConnell patent, it is emphasized that the crude used to produce the high brightness pigments preferably includes not more than 2% by weight of titanium expressed as $TiO_2$. A principal reason for this is that clay minerals occurring in nature, including kaolin clays, frequently contain their discoloring contaminants in the form of iron and/or titanium-based impurities. The quantities of the titaniferous impurities in sedimentary kaolins of Georgia are significant and are commonly present as iron oxide-stained titanium oxides. Irrespective of whether calcining is used, it has commonly been considered in the kaolin industry that it is paramount to refine the crude kaolins to bring the brightness characteristics of the resultant product to a level acceptable for various applications such as paper coating or as mentioned, even for filling. Among the techniques which have been used in the past to remove the discoloring impurities, are the use of hydrosulfites for converting at least part of the iron-based impurities to soluble form, which may then be extracted from the clay. A further method which has come into increasing use in the kaolin industry involves the use of high intensity magnetic separation as described, for example, in such patents as Marston, U.S. Pat. No. 3,627,678. This method is also useful in removing titaniferous impurities in that although titania when pure has little magnetic attractability, the iron-stained titania which forms the basis (as mentioned) for the bulk of discolorants, may often be quite effectively removed by imposition of such a high intensity magnetic field.

One of the further, very effective methods for removing titaniferous impurities including iron oxide-stained titanium oxides, is the froth flotation technique. Generally according to this method, an aqueous suspension or slurry of the clay is formed, the pH of the slurry is raised to an alkaline value and a collector agent is added. The slurry is then conditioned by agitating for a short period. A frothing agent if necessary is added to the conditioned slurry, after which air is passed through the slurry in a froth flotation cell to effect separation of the impurities from the mineral.

Further details regarding the use of froth flotation techniques for removing titanium-based impurities from kaolins may be found at numerous places in the prior art, including for example U.S. Pat. Nos. 3,450,257 to E. K. Cundy, 4,518,491 to B. M. Bilimoria, and U.S. Pat. No. 4,090,688 to Alan Nott. In the procedures set forth in these patents, the iron-stained titania "contaminants" are separated with the froth. These separated materials, because of their very high titania content and high degree of discoloration, have in the past simply been termed "rejects," and as such discarded or used for some purpose unrelated to being pigments for paper manufacture. What therefore is to be especially appreciated, is that the discoloring iron-stained titania-based impurities removed from the crude kaolin by froth flotation (or even where such materials have been removed by magnetic separation), have heretofore been regarded as essentially useless material having little or no economic value for proper manufacture. The view in short, has in the past been that the object of beneficiation of kaolins was simply stated to remove these "contaminants," to thereby brighten the output product from which these contaminants had been removed.

Both the brightness characteristics of the given kaolin and the opacifying properties of same when incorporated as a filler in paper, may be quantitatively related to a property of the filler identified as the "scattering coefficient S". The said parameter, i.e., the scattering coefficient S of a given filler pigment, is a property well-known and extensively utilized in the paper technology art, and has been the subject of numerous technical papers and the like. The early exposition of such measurements was made by Kubelka and Munk, and is reported in *Z. Tech Physik* 12:539 (1931). Further citations to the applicable measurement techniques and detailed definitions of the said scattering coefficient are set forth at numerous places in the patent and technical literature. Reference may usefully be had in this connection, e.g. to U.S. Pat. Nos. 4,026,726 and 4,028,173. In addition to the citations set forth in these patents, reference may further be had to Pulp and Paper Science Technology, Vol. 2 "Paper", Chapter 3, by H. C. Schwalbe (McGraw-Hill Book Company, N.Y.).

SUMMARY OF INVENTION

In accordance with the present invention, and contrary to prior experience and practice in the kaolin industry, it has unexpectedly been found that a pigment possessing highly useful properties, especially with respect to opacifying light weight paper such as newsprint, may be produced by calcining the very high titania content "rejects" yielded by practice of conventional froth flotation beneficiation. Other "rejects" having similar high content of iron-stained titania, as for example those yielded from high intensity magnetic separation (H.I.M.S.), may also be used in the practice of the invention.

According to a preferred method of practicing the present invention, an iron-stained titania-containing kaolin is subjected to froth flotation, after which froth "rejects" comprising kaolin enriched in said iron-stained titania are recovered, then subjected to dewatering and drying, to thereby produce a kaolin enriched in titania. This intermediate is calcined at a temperature in the range of about 1500° to 2200° F. to yield the finished product. The froth "rejects" are not otherwise beneficiated prior to calcining, but are used in their as-is form as recovered from the flotation process. The starting material subjected to the froth flotation is typically a naturally occurring kaolin crude having a titania content of from about 1 to 2 weight %, and the enriched kaolin yielded from the froth flotation process has a titania content of from about 2 to about 15 weight % and preferably has a titania content of at least 5 weight %. Similar considerations apply where H.I.M.S. is the source of the rejects.

When a pigment produced in accordance with the present invention is utilized in the filling of paper, it imparts a brightness in the range of about 60 to 90, but yields subtantially higher opacifying properties than a prior art calcined kaolin not enriched in titania. Yet more preferably, the brightness of the pigment resulting from the invention is in the range of about 60 to 80. To be particularly noted is that brightness values as indicated have typically been considered undesirable for use as fillers; but in accordance with the present invention, these fillers have been found to produce very high opacifying properties, thereby vastly improving the use and printability of such thin, "low grade" papers such as newsprint.

In a further aspect of the invention, it is found that for a given opacity, the retention in the paper web is higher for the present pigments than with prior art pigments, by virtue partially of the relatively large particle size yielded as a result of practice of the invention.

BRIEF DESCRIPTION OF DRAWING

The FIGURE herein is a graph depicting scatter at 10% loading as a function of mean calcined particle size for a series of pigment samples, some of which are prepared in accordance with the invention, and others being controls.

DESCRIPTION OF PREFERRED EMBODIMENT

The practice of the present invention will now be illustrated by Examples, which are deemed illustrative of the invention and not delimitative thereof.

EXAMPLE

In this Example, a series of samples, as set forth in Tables 1 and 2 below, were subjected to calcination in a laboratory muffle furnace for a period of 35 minutes at calcination temperatures as indicated in the same table. The samples identified as "froth" were obtained as the discards from a plant flotation process, which process was substantially in accord with the procedure set forth in the aforementioned U.S. Pat. No. 4,518,491. The froth yielded as overflow from the flotation process was subjected to dewatering and drying prior to being subjected to calcination at the schedule indicated. $TiO_2$ content for each sample was determined after calcination. The products yielded from the calcination treatment were pulverized to a particle size of 99% by weight finer than 325 mesh screen, and the final output product was first measured for brightness using TAPPI procedure T646os75 as previously indicated.

The pigment products yielded by this Example were subjected to tests to determine the pigment scattering coefficient and absorption of the pigment when same was used as a filler in paper at a 10% loading factor by weight. More specifically, the pigment was tested at 10% loading in Storafite (trademark of Nova Scotia Forest Industries) bleached sulphite pulp beaten to a CSF (Canadian Standard Freeness) of 300-350. Deionized water was used in the sheet formation, together with 20 lbs/ton alum, and Percol 292 (trademark of Allied Colloids) as a retention aid.

This 10% value was derived by nominally loading the material at 5, 10, and 15%, obtaining the sheet scatter for the three sets of sheets, fitting the points to a straight line by a least square analysis, and calculating the 10% level by the equation generated.

As a control, the aforementioned Alphatex ® product of Anglo-American Clays Corporation was used at 10% loading under otherwise identical conditions. Table 1 sets forth scatter levels achieved at 10% filler level for the samples. All scattering data are normalized by comparison to the scattering coefficient of samples of the aforementioned Alphatex ®. Ideally in a study of the present nature, the same batch of beaten pulp should be used throughout. As this is not practical, the method adopted was to fill one set of sheets in each series of tests using the same Alphatex ® from series to series. Statistically, the Alphatex ® filled samples at 10% filler had a scattering coefficient of 680 $cm^2$/gram, and in each series in which Alphatex ® differed from 680, the scattering coefficients of the experimental samples were accordingly adjusted proportionally to the adjustments which the Alphatex ®-containing paper required to bring its value to 680 $cm^2$/gram. This procedure, which was used in subsequent examples, is from time to time referred to in the specification as "normalizing" the scattering coefficients.

In the case of the data in Table 2, the filler level was varied in the manner indicated. The data in Table 1 all reflects a filling level of 10%. Opacity was determined by TAPPI Procedure T519 om-86. The absorption coefficient is derived from the Kubelka and Munk analysis, op. cit.

TABLE 1

| | | Pigment Physical and Optical Properties | | | |
|---|---|---|---|---|---|
| Sample | TiO$_2$ Conc. | Calcination Temperature | Pigment Brightness | Normalized Scatter (10%) | Absorption Coefficient (100%) |
| Froth | 7.7% | 1975° F. | 88.0% | 676 cm$^2$/gm | 77.7 cm$^2$/gm |
| Froth | 7.7 | 1650 | 72.6 | 660 | 183.3 |
| Hiopaque | 1.0 | NA | 87.0 | 594 | 34.4 |
| Alphatex | 1.4 | 1975 | 92.5 | 680 | 13.0 |

TABLE 2

Filler Loading Required to Give Equal Sheet Opacity

| Pigment | % Filler Loading | Sheet Brightness | Sheet Opacity @ 60 gsm |
|---|---|---|---|
| Alphatex | 3.0 | 85.4% | 78.1% |
| Froth (1975°) | 2.2 | 83.6 | 78.1 |
| Froth (1650°) | 2.0 | 81.3 | 78.1 |
| Hiopaque | 4.2 | 84.1 | 78.1 |

As is seen, the froth product was in the case of the first two samples used directly. Also, as controls two commercial calcined kaolin products were used and evaluated, namely HiOpaque which is a product of Engelhard Corporation and the aforementioned Alphatex ® product.

Table 2 is of particular interest in showing the percentage of filler that is required with the differing samples in order to produce the opacity level 78.1, which is held constant at the right-hand column. It is of great significance to note here that in order to thus achieve the same opacity as can be obtained with the product of the invention, it is necessary to typically use 50% more content of Alphatex ® which is, however, a much higher cost product. The brightness of the products of the present invention are seen to be relatively low, but this is not considered in any way a detriment for the application of the said products to the area where they find most value, namely in filling so-called low cost thin papers, such as newsprint. In these instances, it is especially the opacity which is of interest, and the products of this invention yield outstanding results in that respect as can be seen from the appended data.

EXAMPLE II

In the FIGURE herein, scatter at 10% loading has been plotted against mean calcined particle size for a series of samples, some of which are prepared as in the invention, and others being prior art controls (as identified in the graph). The showing illustrates that for any given particle size, scatter is much higher for the iron-stained titania enriched products of the invention.

While the present invention has been set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed and limited only by the scope and spirit of the claims now appended hereto.

We claim:

1. A method of producing a high opacifying pigment which comprises subjecting an iron-stained titania-containing kaolin to froth flotation, recovering froth "rejects" comprising kaolin enriched in said iron-stained titania, said enriched kaolin containing said titania in the amount of above 2 weight percent to about 15 weight percent, dewatering and drying said froth "rejects", and calcining said "rejects" having above 2 to about 15 weight % titania at a temperature in the range of about 1500° to about 2200° F.

2. The method according to claim 1 in which the froth "rejects" are not further beneficiated prior to calcining.

3. The method according to claim 1 in which the starting material is a naturally occurring kaolin having a titania content of from about 1 to 2 weight %.

4. The method according to claim 3 in which said enriched kaolin has a titania content of at least 3 weight %.

5. A pigment comprising the calcined product of froth "rejects" containing kaolin enriched in iron-stained titania, said enriched kaolin containing said titania in the amount of above 2 weight percent to about 15 weight percent and being derived from a kaolin froth flotation, said pigment imparting to paper when used as a filler a brightness in the range of about 60–90 and having higher opacifying properties than calcined kaolin not enriched in titania.

6. The pigment as set forth in claim 5 in which brightness is in the range of about 60–80.

7. A method of producing a high opacifying kaolin paper filling pigment, which comprises beneficiating an iron-stained titania-containing kaolin crude including at least 1% by weight titania, by separating therefrom a kaolin "reject" fraction containing from 2 to 15 weight % of titaniferous discoloring contaminants; recovering said "reject" fraction and dewatering and drying the same to produce a kaolin enriched in titania; and calcining the said "reject" fraction having said from 2 to 15 weight % of titaniferous discoloring contaminants at a temperature in the range of about 1500° to about 2200° F.

8. The method according to claim 1, in which the "reject" kaolin fraction is not otherwise beneficiated prior to calcining.

9. The method according to claim 7, in which said "reject" kaolin fraction has a titania content of at least 3 weight %.

10. The method according to claim 7, in which said "reject" kaolin fraction has a titania content of at least 5 weight %.

11. A method in accordance with claim 7, in which said kaolin crude is beneficiated by high intensity magnetic separation.

12. A method in accordance with claim 7, in which said kaolin crude is beneficiated by a froth flotation.

* * * * *